US008160786B2

(12) United States Patent
Morath et al.

(10) Patent No.: US 8,160,786 B2
(45) Date of Patent: Apr. 17, 2012

(54) MOBILE CRANE AND METHOD FOR OPERATING A MOBILE CRANE

(75) Inventors: Erwin Morath, Lauterach (DE); Peter Abel, Mengen (DE)

(73) Assignee: Liebherr-Werk Ehingen GmbH, Ehingen (DE)

( * ) Notice: Subject to any disclaimer, the term of this patent is extended or adjusted under 35 U.S.C. 154(b) by 249 days.

(21) Appl. No.: 12/387,210

(22) Filed: Apr. 29, 2009

(65) Prior Publication Data

US 2009/0276126 A1 Nov. 5, 2009

(30) Foreign Application Priority Data

Apr. 30, 2008 (DE) ........................ 10 2008 021 627

(51) Int. Cl.

| | |
|---|---|
| ***G06F 7/70*** | (2006.01) |
| ***G06F 19/00*** | (2006.01) |
| ***G06F 7/00*** | (2006.01) |
| ***G06F 7/76*** | (2006.01) |

(52) U.S. Cl. ........................................................ 701/50

(58) Field of Classification Search ..................... 701/50

See application file for complete search history.

(56) References Cited

U.S. PATENT DOCUMENTS 7,012,540 B2 3/2006 Petzold et al.

FOREIGN PATENT DOCUMENTS

| | | |
|---|---|---|
| DE | 20 2006 017 724 | 4/2008 |
| EP | 0614845 | 9/1994 |
| EP | 1659235 | 5/2006 |
| EP | 1746064 | 1/2007 |

*Primary Examiner* — Christopher J. Novosad

(74) *Attorney, Agent, or Firm* — Dilworth & Barrese, LLP.

(57) ABSTRACT

A mobile crane has at least one memory unit in which limit curves or limit values are stored for various crane parameters and which should not be exceeded, or only exceeded by issuing an alarm signal, to ensure safe operation of the crane. Crane safety is ensured by monitoring the individual limit values of the various parameters and checking the current position of the extendable and retractable props which serve to support the mobile crane. Depending upon the actual position the supporting cylinders reach, the tilting edge of the mobile crane is determined as a limit value. Furthermore, depending on the individual parameters of the mobile crane and the suspended load, whether the operating condition of the mobile crane lies within this limit value is determined.

20 Claims, 1 Drawing Sheet

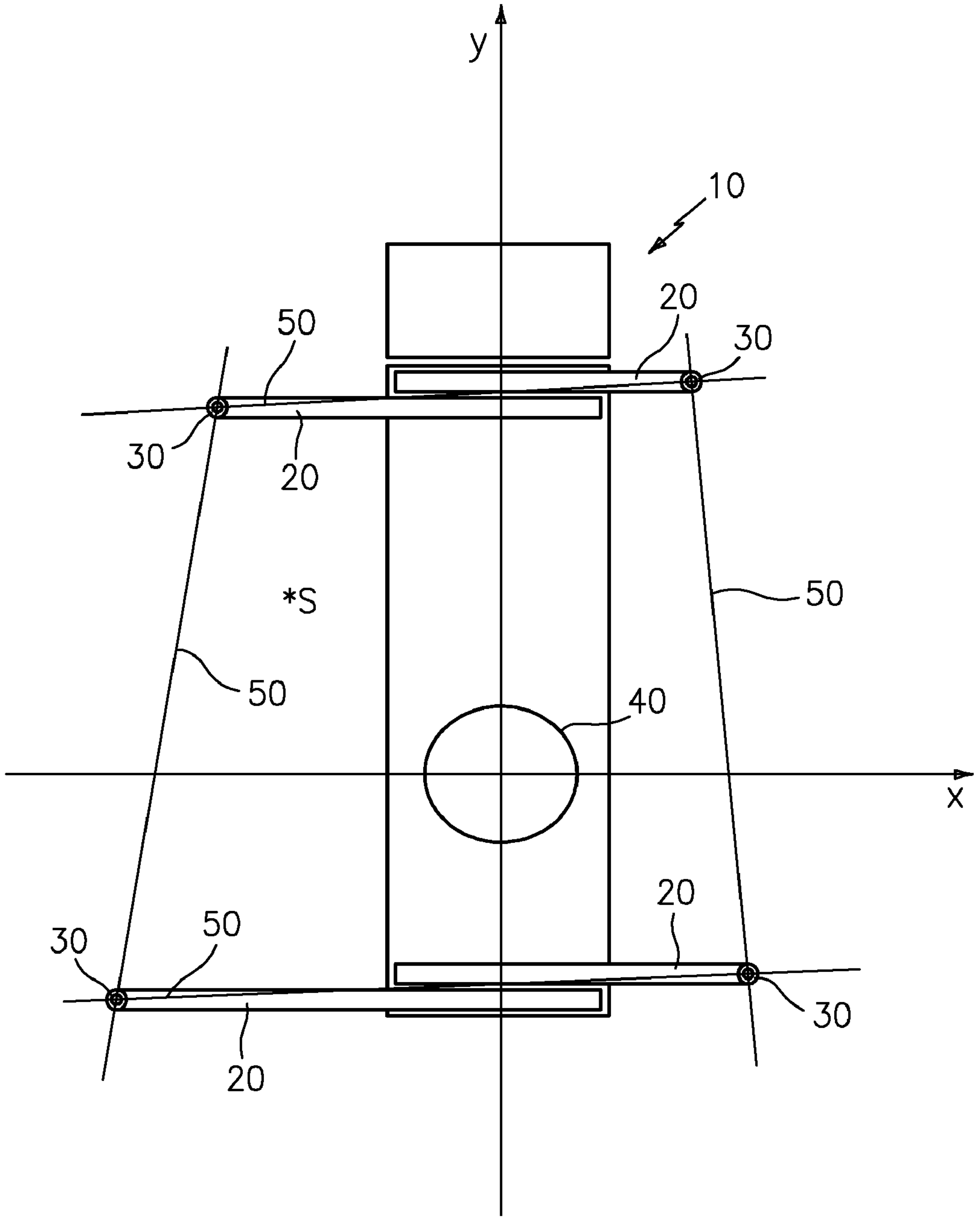
y
10
20
50
30
30
20
*S
50
50
40
x
20
50
30
30
20

MOBILE CRANE AND METHOD FOR OPERATING A MOBILE CRANE

BACKGROUND OF THE INVENTION

This invention relates to a mobile crane with an overload protection according to the description herein.

In the overload protection of cranes, a limit curve usually is stored now for different crane configurations, which is monitored for exceedance during crane operation. Parameters relevant for crane safety include for instance the component strength of boom systems, hoisting cables, slewing ring, adjusting cylinders, mechanical connections etc. on the one hand and the static stability of the crane on the other hand. For each of these parameters, limit criteria exist, the minimum of which forms said limit curve, which is stored in a memory unit of the crane and which is monitored for exceedance during crane operation.

A disadvantage of such overload protections consists in that for every conceivable crane configuration and every possible supporting position including the extendable and retractable props a separate limit curve or lifting capacity table must be stored, which is comparatively expensive.

According to DE 20 2006 017 730 A1 it now is provided that individual limit curves or limit values are stored in the memory unit for various parameters of the crane, which must not be exceeded, or only by issuing a signal, in order to ensure the safety of the crane operation. In contrast to the aforementioned prior art, individual limit curves, for instance the admissible lifting capacity, thus are stored for the parameters boom strength, hoisting cable strength, static stability, etc. The means to ensure crane safety are configured such that they monitor these individual limit curves or also limit values of the various parameters for exceedance or approach. The advantage of this solution already has consisted in that the quantity of data to be stored or the size of the lifting capacity table can be reduced, since limit criteria need not always change with every change of a configuration of the components.

From DE 10 2005 035 729 A1 a method for operating a crane is known, whose admissible lifting capacity depends on one or more variable parameters. Accordingly, it is provided that the variation of the parameters is performed such that the speed of parameter variation is reduced continuously or incrementally, before a parameter value is reached, at which the admissible lifting capacity corresponds to the actual lifting capacity. Hence, there is no sudden or abrupt stop from the full speed of adjustment, but a continuous or incremental deceleration.

Finally, a mobile crane with extendable and retractable props for supporting the mobile crane is known from DE 10 2007 055 535 A1. Here, it is proposed that the mobile crane includes detection means for detecting the supporting forces in the supporting cylinders and a control means which is connected with the detection means and is configured such that it controls the extension and/or retraction of the supporting cylinders in dependence on the supporting forces or parameters detected by means of the detection means.

With the known overload protection, a mobile crane hence already can determine the length of the boom, the outreach, the angle of the boom and other operating parameters in dependence on the suspended weight, wherein the various strength values in accordance with the lifting capacity table and also the static stability are considered for a specific condition of the support. In real use, however, it frequently occurs that the props of the support of the mobile crane cannot be moved into the defined desired positions. For instance, insufficient space conditions during erection of the mobile crane are responsible for this situation.

SUMMARY OF THE INVENTION

It is the object of the invention to develop a generic mobile crane such that an overload protection is provided, which takes into account any kind of supporting geometry of the mobile crane.

In accordance with the invention, this object is solved by the combination of the features herein. Accordingly, the mobile crane includes at least one memory unit, in which limit curves or limit values are stored for various crane parameters, which should not be exceeded, or only by issuing an alarm signal, to ensure the safety of the crane operation. Furthermore, there are provided means to ensure crane safety, which are configured such that they monitor the individual limit values of the various parameters for exceedance. Finally, means are included, by which the current position of the extendable and retractable props, which serve to support the mobile crane, can be monitored. In accordance with the invention, means are provided, which in dependence on the actual position of the props reached determine the tilting edge of the mobile crane as limit value, and furthermore means are provided, which in dependence on the individual parameters of the mobile crane and the suspended load determine whether the operating condition of the mobile crane lies within the limit values.

Preferred aspects of the invention can be taken from the description herein.

Accordingly, the means for determining the operating condition can consider the crane parameters stored in the memory.

Preferably, means are provided, which monitor the load limit of the extended props.

Finally, means are provided in addition, which calculate the load limit of the props in dependence on their extended condition and at least part of the remaining parameters of the mobile crane.

In accordance with a further advantageous aspect of the invention, a calculation module is provided, by means of which the actual value of the static stability of the mobile crane can be calculated, and a comparator module by means of which the actually calculated static stability value can be compared with the stored limit values. If the comparison of the actual value of the static stability with the stored limit values now results in that the actual value approaches the limit value, the operation of the mobile crane can be intervened in.

It is particularly advantageous when a safety distance to the limit values is maintained with regard to all degrees of freedom of the mobile crane. The degrees of freedom advantageously concern the telescoping of the boom, the extension of ballast and all operative movements, such as rotating the uppercarriage, luffing the boom and the derrick boom, moving the auxiliary jib or changing the spread angle of the Y-bracing.

The method can be performed fully automatically, wherein two independent control circuits are provided, in order to ensure the redundancy of the control on the one hand and each check the operability of the entire system on the other hand, in that the two independently provided control circuits check the operability of the other control circuit.

Advantageously, the overload protection described above also can be calculable in advance when planning the operation of the mobile crane by means of a simulation calculation in the crane operation planner.

Finally, the values stored in the memory in the form of lifting capacity tables can be decomposed into individual criteria, so that they can be superposed as desired during the calculation. In this way, memory space can be saved, since according to the known method lifting capacity tables generally had to be stored separately in consideration of the various crane parameters for different extension lengths of the sliding beams of the props.

When storing the lifting capacity tables in the memory, the associated strength values of the mobile crane parts upwards from the slewing ring, i.e. for the uppercarriage of the mobile crane, can be stored individually independent of the respective supporting condition. Merely the load limits of the props must be monitored and possibly be calculated and cross-checked.

BRIEF DESCRIPTION OF THE DRAWING

Further features, details and advantages of the invention can be taken from the embodiment illustrated in the drawing. The only FIGURE schematically shows a supporting situation of a mobile crane which here is illustrated only very schematically.

The FIGURE shows a mobile crane 10 with four props 20 which in their terminal regions include vertically extendable and retractable supporting cylinders 30, by means of which the mobile crane 10 can be supported. Reference numeral 40 designates the slewing ring of the mobile crane.

DESCRIPTION OF THE PREFERRED EMBODIMENT

Both the props 20 and the supporting cylinders 30 on the props 20 each are extendable and retractable hydraulically.

In accordance with the prior art it was known that overload protection systems only consider symmetrical supporting geometries. This is due to the fact that the lifting capacity tables stored in the respective memory of the control of the mobile crane 10 were stored for discrete symmetrical supporting conditions, for instance for half the extension of the props 20 or for the full extension of the props 20.

In real operation, however, it frequently is not possible for the crane operator to symmetrically support the mobile crane, i.e. to move the supports 20 to specified desired symmetrical positions. Very frequently, the restricted space conditions lead to the fact that the mobile crane must be operated with an asymmetrical support. There is obtained, for instance, a support as it is schematically shown in the FIGURE.

As shown in the FIGURE, so-called tilting edges 50 of the mobile crane 10 are obtained by connecting the supporting points, which are defined by the supporting cylinders 30 at the end of the props 20. In accordance with the present invention, the tilting edges 50 are determined as limit value. In dependence on the individual parameters of the mobile crane and the suspended load, it now is checked whether a current center of gravity S of the entire system comes to lie in the vicinity of the corresponding limit value, i.e. the tilting edge 50.

In a non-illustrated manner, a schematic representation of each of the tilting edges 50 obtained in reality can be displayed on the operator display in the cabin, so that the respective center of gravity obtained is indicated to the crane operator himself by means of a two-dimensional or three-dimensional representation. The center of gravity is tracked continuously corresponding to the actual conditions, so that the crane operator can easily estimate whether he comes close to the limit value specified by the tilting edge 50. If the center of gravity resulting from the current operating condition comes too close to the tilting edge, intervention in the system will be necessary. Such intervention for instance can consist in that the movement is decelerated towards the limit values, wherein a safety distance is maintained in all degrees of freedom, for instance when telescoping the boom out during extension of the ballast or during the operative movements, such as stewing the boom, luffing the boom or the auxiliary boom, lifting the hoisting gear, the slewing movement, etc.

Corresponding limit regions for maintaining the safety distance can be visualized for the crane operator, so that he correspondingly adjusts the crane parameters himself.

Instead of the adjustment by the crane operator, a fully automatic adjustment can, however, also be effected, wherein here a redundant control must be performed. Two independent control circuits not shown in detail must be provided here.

When calculating the respective operating condition of the mobile crane, stored lifting capacity tables will be considered, which in accordance with this invention substantially are reduced as compared to known lifting capacity tables in that they are decomposed into individual criteria, which then can be superposed as desired depending on the operating point.

The invention claimed is:

1. A mobile crane comprising at least one memory unit in which for various crane parameters, stability limit curves or values are stored and which should not be exceeded to ensure stable, safe crane operation, and means for monitoring position of center of gravity of the crane from individual limit values of the various parameters and signaling if position of the center of gravity approaches, reaches or exceeds any of these limit values, wherein said crane comprises horizontally-extendable props (20) and supporting cylinders (30) each positioned at an end of a respective (20) and being vertically extendable, a line (50) connecting respective ends of the props (20) at which the supporting cylinders (30) are positioned defining a tilting edge (50) or limit value, said means checking current position of the extendable and retractable props (20) which serve to support the mobile crane, in dependence on the actual position of the props (20) reached, determine the tilting edge (50) of the mobile crane as limit value, and whether position of the center of gravity approaches, reaches or exceeds any of these limit values (50) and the operating condition of the mobile crane lies within, approaches or exceeds any of the limit values (50).

2. The mobile crane according to claim 1, wherein the means for determining the operating condition consider the crane parameters stored in the memory.

3. The mobile crane according to claim 2, wherein means are provided, which monitor the load limit of the extended props.

4. The mobile crane according to claim 3, wherein means are provided in addition, which calculate the load limit of the props in dependence on their extended condition and at least part of the remaining parameters of the mobile crane.

5. The mobile crane according to claim 4, comprising a calculation module, by which the actual value of the static stability of the mobile crane can be calculated, and a comparator module, by which the actually calculated static stability value can be compared with the stored limit values.

6. A method for operating a mobile crane according to claim 5, wherein the actual value of the static stability is compared with the stored limit values and that when approaching the limit value, the operation of the mobile crane will be intervened in.

7. The mobile crane according to claim 3, comprising a calculation module, by which the actual value of the static stability of the mobile crane can be calculated, and a comparator module, by which the actually calculated static stability value can be compared with the stored limit values.

8. A method for operating a mobile crane according to claim 7, wherein the actual value of the static stability is compared with the stored limit values and that when approaching the limit value, the operation of the mobile crane will be intervened in.

9. The mobile crane according to claim 2, comprising a calculation module, by which the actual value of the static stability of the mobile crane can be calculated, and a comparator module, by which the actually calculated static stability value can be compared with the stored limit values.

10. The mobile crane according to claim 1, wherein means are provided, which monitor the load limit of the extended props.

11. The mobile crane according to claim 10, wherein means are provided in addition, which calculate the load limit of the props in dependence on their extended condition and at least part of the remaining parameters of the mobile crane.

12. The mobile crane according to claim 11, comprising a calculation module, by which the actual value of the static stability of the mobile crane can be calculated, and a comparator module, by which the actually calculated static stability value can be compared with the stored limit values.

13. The mobile crane according to claim 10, comprising a calculation module, by which the actual value of the static stability of the mobile crane can be calculated, and a comparator module, by which the actually calculated static stability value can be compared with the stored limit values.

14. The mobile crane according to claim 1, comprising a calculation module, by which the actual value of the static stability of the mobile crane can be calculated, and a comparator module, by which the actually calculated static stability value can be compared with the stored limit values.

15. A method for operating a mobile crane according to claim 14, wherein the actual value of the static stability is compared with the stored limit values and that when approaching the limit value, the operation of the mobile crane will be intervened in.

16. The method according to claim 15, wherein in all degrees of freedom of the mobile crane a safety distance to the limit values is maintained.

17. The method according to claim 16, wherein the degrees of freedom comprise telescoping the boom, extending the ballast and all operative movements such as rotating the uppercarriage, luffing the boom and the derrick boom, moving the auxiliary jib or changing the spread angle of the Y-bracing.

18. The method according to claim 1, wherein the method is performed fully automatically, wherein two independent control circuits are provided, to on the one hand ensure the redundancy and on the other hand check the operability of the system.

19. The method according to claim 1, wherein the use of the mobile crane is calculated in advance by a simulation calculation in the crane operation planner.

20. The method according to claim 1, wherein the values stored in the memory in the form of lifting capacity tables are decomposed into individual criteria, so that they can be superposed as desired in the calculation.

* * * * *